United States Patent
Eapen et al.

(10) Patent No.: US 10,678,540 B2
(45) Date of Patent: Jun. 9, 2020

(54) ARITHMETIC OPERATION WITH SHIFT

(71) Applicant: Arm Limited, Cambridge (GB)

(72) Inventors: Jacob Eapen, Waterbeach (GB); Mbou Eyole, Soham (GB); Neil Burgess, Cardiff (GB)

(73) Assignee: Arm Limited, Cambridge (GB)

( * ) Notice: Subject to any disclaimer, the term of this patent is extended or adjusted under 35 U.S.C. 154(b) by 80 days.

(21) Appl. No.: 15/973,663

(22) Filed: May 8, 2018

(65) Prior Publication Data

US 2019/0347099 A1 Nov. 14, 2019

(51) Int. Cl.
*G06F 9/30* (2018.01)

(52) U.S. Cl.
CPC ........ *G06F 9/30032* (2013.01); *G06F 9/3001* (2013.01); *G06F 9/30101* (2013.01); *G06F 9/30145* (2013.01)

(58) Field of Classification Search
None
See application file for complete search history.

(56) References Cited

U.S. PATENT DOCUMENTS

| | | | | |
|---|---|---|---|---|
| 4,569,016 A * | 2/1986 | Hao | ........ | G06F 9/30018 712/224 |
| 5,721,892 A * | 2/1998 | Peleg | ........ | G06F 7/5443 708/490 |
| 6,711,602 B1 * | 3/2004 | Bhandal | ........ | G06F 9/3853 708/625 |
| 6,760,742 B1 * | 7/2004 | Hoyle | ........ | G06F 7/724 708/492 |
| 7,062,526 B1 * | 6/2006 | Hoyle | ........ | G06F 7/49947 708/550 |
| 2014/0208079 A1 * | 7/2014 | Bradbury | ........ | G06F 9/3001 712/222 |
| 2015/0006858 A1 * | 1/2015 | Toll | ........ | G06F 9/30018 712/208 |
| 2015/0058389 A1 * | 2/2015 | Blomgren | ........ | G06F 7/525 708/209 |
| 2016/0357563 A1 * | 12/2016 | Van Dalen | ........ | G06F 9/30036 |

OTHER PUBLICATIONS

R. Bedichek, "Some Efficient Architecture Simulation Techniques" Winter 1990 USENIX Conference, Jan. 22-26, 1990, 12 pages.

* cited by examiner

*Primary Examiner* — Eric Coleman
(74) *Attorney, Agent, or Firm* — Nixon & Vanderhye P.C.

(57) ABSTRACT

An apparatus and method are provided for efficiently performing arithmetic operations that include at least a multiplication operation. The apparatus comprises processing circuitry to perform data processing operations, and instruction decode circuitry responsive to program instructions to generate control signals to control the processing circuitry to perform the data processing operations. In response to an arithmetic operation with shift instruction specifying performance of an arithmetic operation comprising at least a multiplication operation, and having a field which provides a programmable shift indication, the instruction decode circuitry is configured to control the processing circuitry to perform the arithmetic operation during which an intermediate value is produced, and to select a target portion of the intermediate value based on an output window determined from the programmable shift indication.

20 Claims, 13 Drawing Sheets

ARITHMETIC OPERATION WITH SHIFT

BACKGROUND

The present technique relates to data processing.

A data processing apparatus may be provided to perform arithmetic operations, and some arithmetic operations may comprise at least a multiplication. The product produced by the multiplication may have a higher precision than the input operands, but it is often the case that the full precision available from the multiplication is not required, and additional operations may need to be performed to convert the result back to the original precision.

In many modern systems, it is highly desirable to be able to perform arithmetic operations that comprise at least a multiplication as quickly and efficiently as possible. For example, multiply and accumulate (MAC) operations form the basic operation for many DSP kernels, and improving the performance of such operations may provide a significant performance improvement.

SUMMARY

In one example, the present technique provides an apparatus comprising:
processing circuitry to perform data processing operations; and
instruction decode circuitry responsive to program instructions to generate control signals to control the processing circuitry to perform the data processing operations;
wherein in response to an arithmetic operation with shift instruction specifying performance of an arithmetic operation comprising at least a multiplication operation, and having a field which provides a programmable shift indication, the instruction decode circuitry is configured to control the processing circuitry to perform the arithmetic operation during which an intermediate value is produced, and to select a target portion of the intermediate value based on an output window determined from the shift indication.

In another example, the present technique provides a data processing method comprising:
executing software on processing circuitry to perform data processing operations; and
decoding instructions provided by the software to control the processing circuitry to perform the data processing operations;
wherein in response to an arithmetic operation with shift instruction specifying performance of an arithmetic operation comprising at least a multiplication operation, and having a field which provides a programmable shift indication, the method further comprises controlling the processing circuitry:
to perform the arithmetic operation during which an intermediate value is produced, and
to select a target portion of the intermediate value based on an output window determined from the programmable shift indication.

In another example, the present technique provides a computer program for controlling a host data processing apparatus to provide an instruction execution environment comprising:
processing program logic to perform data processing operations; and
instruction decode logic responsive to program instructions to control the processing program logic to perform data processing operations;
wherein in response to an arithmetic operation with shift instruction specifying performance of an arithmetic operation comprising at least a multiplication operation, and having a field which provides a programmable shift indication, the instruction decode logic is configured to control the processing program logic to perform the arithmetic operation during which an intermediate value is produced, and to select a target portion of the intermediate value based on an output window determined from the programmable shift indication.

In another example, the present technique provides an apparatus comprising:
processing means for performing data processing operations; and
decode means for decoding program instructions to generate control signals to control the processing means to perform the data processing operations;
wherein in response to an arithmetic operation with shift instruction specifying performance of an arithmetic operation comprising at least a multiplication operation, and having a field which provides a programmable shift indication, the decode means is for controlling the processing means to perform the arithmetic operation during which an intermediate value is produced, and to select a target portion of the intermediate value based on an output window determined from the shift indication.

BRIEF DESCRIPTION OF THE DRAWINGS

The present technique will be described further by way of illustration only, with reference to examples thereof as illustrated in the accompanying drawings, in which.

DESCRIPTION OF EXAMPLES

Figure 1:
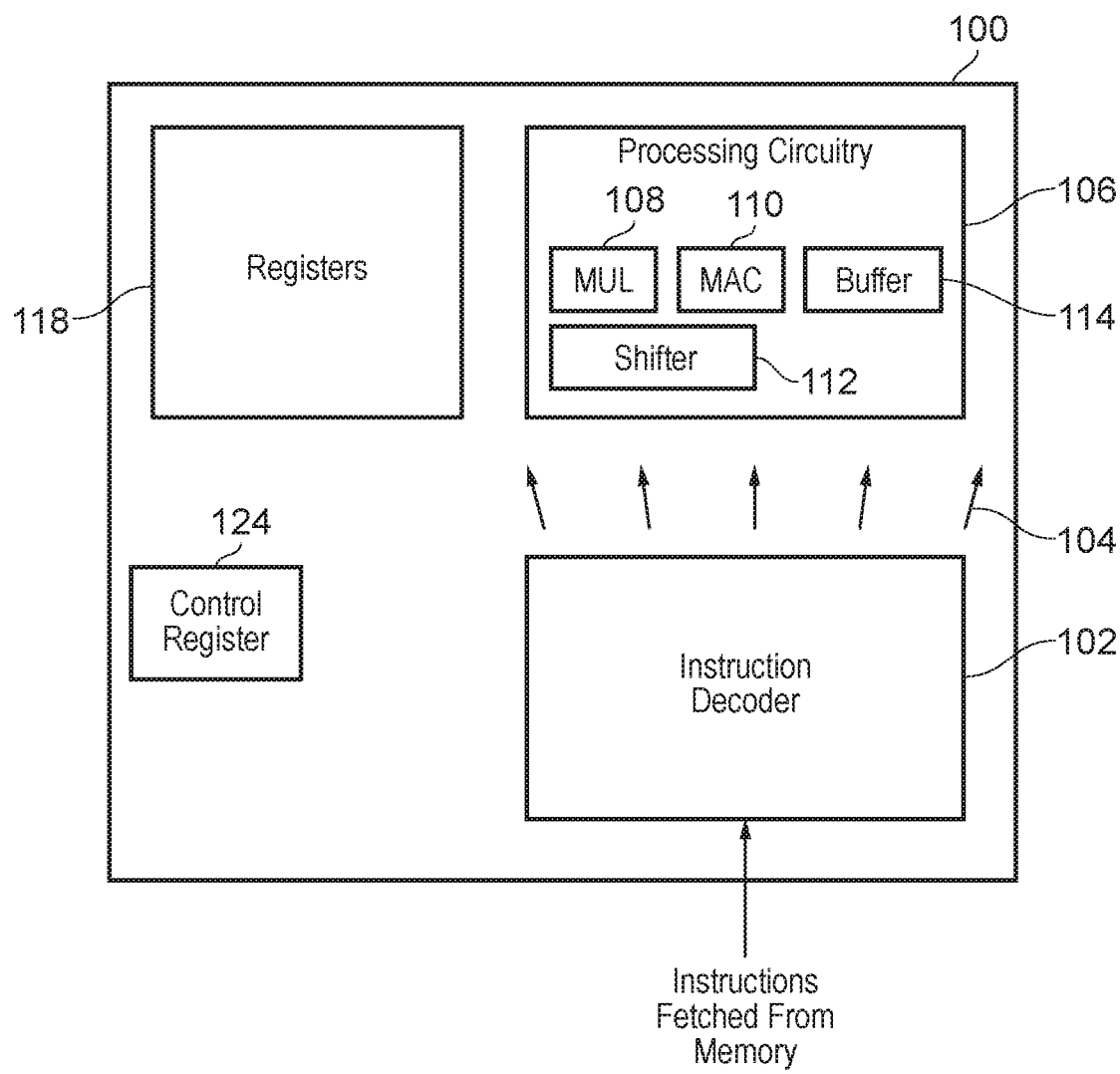
FIG. 1 schematically illustrates an example of a data processing apparatus according to the present technique.

At least one example described herein provides an apparatus comprising processing circuitry to perform data processing operations, and instruction decode circuitry responsive to program instructions to generate control signals to control the processing circuitry to perform the data processing operations. In response to an arithmetic operation with shift instruction specifying performance of an arithmetic operation comprising at least a multiplication operation, and having a field which provides a programmable shift indication, the instruction decode circuitry is configured to control the processing circuitry to perform the arithmetic operation during which an intermediate value is produced, and to select a target portion of the intermediate value based on an output window determined from the programmable shift indication.

In some cases, performing an arithmetic operation comprising at least a multiplication operation generates a result having up to twice the bit size than that of the input operands. Such operations can be followed by additional processing to trim this larger result down to an output value having a smaller bit size, matching that of the input operands for example. For this reason, the larger result that is initially generated may be referred to as an intermediate result. Typically the additional processing would be performed by execution of further instructions subsequent to the instruction corresponding to the arithmetic operation comprising the multiplication. The further instructions are arranged to take into account the bit widths of the input operands, and the desired bit width of a final output result. For example, when two T-bit input operands are multiplied together, an intermediate result may be a 2T-bit value. However, when it is desired that the result of the multiplication be the same size as the inputs, further instructions will need to be executed to select the desired T-bits of the 2T-bit value as a final output.

The present technique recognises that this form of additional processing can incur performance and power consumption costs which can be avoided. The processing of additional instructions not only increases the latency of the operation, but also increases power consumption. However, by providing an arithmetic shift instruction with a programmable shift indication, from which the target portion of the intermediate value is selected, a single instruction can be executed to provide a result containing the required portion of the intermediate result, and having a desired bit width. Execution of a single instruction is faster and consumes less power than execution of a sequence of instructions, and therefore the present technique improves efficiency. It is counterintuitive to provide bespoke instructions for performing such specific operations, as instruction encoding space is a valuable architecture resource. However, the present technique recognises that in this case the encoding expense incurred in view of this new instruction is outweighed by the advantages in terms of flexibility and efficiency.

In some examples, the processing circuitry supports processing of operands having fixed point formats, and the arithmetic operation with shift instruction is a fixed point format agnostic instruction. In particular, the same instruction can be used independent of the particular fixed point format of the input operands, with the programmable shift amount be used to take account of the fixed point format of the input operands, and the desired fixed point format of the result. The present technique is particularly advantageous in the context of fixed point arithmetic, as the selection of the target portion of the intermediate value corresponds to a trade off between precision and range, with more significant bits being selected to provide a larger range at the expense of precision, and less significant bits being selected to provide greater precision, but limiting the possible results to a smaller range. The programmable shift indication provides a programmer with the additional flexibility to navigate this trade off in a straightforward manner, as single instruction can be used to select any of bits of the intermediate value depending on whether a large range, or high precision, is desired.

In some examples, the programmable shift indication is determined in dependence on a fixed point format of each input operand to the arithmetic operation, and a desired fixed point format of a result of the arithmetic operation. The present technique has recognised that due to the nature of some formats of fixed point numbers, the positioning of the output window as determined from the shift indication influences the format of the final result. Therefore, a programmer has a higher degree of flexibility as they are able to select a desired format of the final result of the operation by setting the programmable shift indication accordingly.

In some examples, the field is an immediate field of the arithmetic operation with shift instruction encoding the programmable shift indication. This use of the immediate field gives a programmer the flexibility to specify the programmable shift indication directly within the instruction, to take into account their desired precision for the result of the arithmetic operation, allowing subsequent performance of the shift operation to generate the desired result. This relieves the need for the programmer to determine an appropriate sequence of instruction to instead modify the result to obtain the desired result.

In some other examples, the field is a register specifier to specify a register storing the programmable shift indication. This is another flexible way of specifying the shift indication, as other instructions in the program code may be utilised to change the shift amount indicated in the relevant register at the appropriate stages in the program.

In some examples, the apparatus further comprises adjustment circuitry to control an adjustment operation on the target portion of the intermediate value based on the output window. The adjustment circuitry can be used in order to account for bits of the intermediate value falling outside of the output window by modifying the bits of the target portion based on these bits to reflect their value, and hence provide a more accurate result. For example, the adjustment operation may be at least one of a rounding operation and a saturation operation, wherein the value of bits of the intermediate value less significant than the target portion are used when the adjustment operation is the rounding operation, and the value of bits of the intermediate value more significant than the target portion are used when the adjustment operation is the saturation operation. In one example implementation, saturation can be performed based on the sign of the intermediate value.

In some examples, the arithmetic operation is a multiply and accumulate operation, and the adjustment circuitry comprises saturation detection circuitry configured to determine whether saturation occurs as a result of the accumulate operation, wherein when saturation does occur as a result of the accumulate operation, the saturation detection circuitry is configured to provide an output saturated value as a result of the multiply and accumulate operation. In some instances, it may only be necessary to perform the saturation operation based on the accumulate result. For example, if when the target portion of the intermediate result is selected based on the output window, a number of more significant bits of the intermediate value outside of the output window are also provided to the accumulate stage, this can retain sufficient information to enable the saturation check to be performed in one go after the accumulation operation. This arrangement is particularly efficient, since less saturation detection circuitry is needed to provide accurate results.

However, in some examples, the saturation detection circuitry may be further configured to determine whether saturation occurs as a result of the multiply operation based on the output window, wherein when saturation does occur as a result of the multiply operation, the saturation detection circuitry is configured to provide an intermediate saturated value as the target portion input to the accumulate operation. This arrangement simplifies the accumulate stage, as by detecting saturation at the multiply stage, the intermediate value can be fully trimmed to the output window size prior to the accumulate stage. The accumulate stage can then be performed on the smaller, trimmed, value, and hence any circuitry for performing the accumulate operation can be less complex.

In some examples, the arithmetic operation is a multiply and accumulate operation involving a multiplication operation and a subsequent accumulate operation, and the apparatus further comprises: alignment circuitry to align an accumulator value with a full precision product result of the multiplication operation prior to performance of the accumulate operation, wherein the intermediate value is formed by the result of the accumulate operation, and the processing circuitry is configured to select the target portion from the intermediate value resulting from the accumulate operation, and the adjustment circuitry is rounding and saturation circuitry to perform rounding and saturation operations on the target portion. By performing the multiply and accumulate operation at the width of the product result, only a single instance of rounding and saturation circuitry is required to perform all the adjustment operations for obtaining an accurate result.

The input operands for the arithmetic operation can take a variety of forms, and may or may not be of the same size. However, in one example, the operands of the arithmetic operation comprise M-bits, and the intermediate value comprises N bits, wherein N is greater than M.

There are number of ways in which the intermediate value may be maintained within the processing circuitry whilst the target portion is selected from the intermediate value, and in one example the apparatus further comprises an intermediate buffer to store the intermediate value of the arithmetic operation for this purpose.

In some examples the processing circuitry is configured to perform vector processing wherein the data processing operations are performed on each data element of vector operands to generate corresponding data elements of a result vector, wherein in response to the arithmetic operation with shift instruction the instruction decode circuitry is configured to control the processing circuitry to perform the arithmetic operation for each data element of a first vector operand with each data element of a second vector operand to generate data elements of the result vector. The arithmetic operation with shift instruction is particularly advantageous in a vector context, because by providing all operations in one instruction, namely the arithmetic operation with shift instruction, there is no need to write any intermediate values (which are typically significantly larger than the input operands) back to a destination register, as would otherwise be the case, and instead the destination register can be populated with the data elements of the result vector, each data element corresponding to a selected target portion of the corresponding intermediate value. As such, the present technique can perform more instances of the arithmetic operation in parallel, using more densely packed vector operands.

In some examples a size of the output window selected by the processing circuitry is dependent on an element size of at least one of the first and second vector operands. The element size can be specified in a variety of ways. For example, it may be defined within the control storage element, or alternatively it may be specified within the instruction.

In some examples, the processing circuitry provides a plurality of lanes of parallel processing such that the arithmetic operation is performed in parallel in each lane using corresponding data elements of the first and second vector operands. Due to the fact that the intermediate values are consumed entirely within the operation, and only the target portion of the intermediate value in each lane is output, this enables an increase in the number of lanes that can be provided within a processing circuit having a particular pipeline width, hence increasing the number of operations which can be performed in parallel.

In situations where the element size is specified by the instruction, there are number of ways in which the element size may be provided. For example, a separate field may be provided within the instruction to identify the element size. However, in one example implementation, the shift indication encodes information indicative of the element size of the data elements of the vector operands. In particular, since the overall range of shifting that may need to be applied will depend on the element size, it is possible to use a predetermined number of bits to specify both the element size and the shift amount. For example, as the element size decreases, it is possible to use a larger number of bits to identify the element size, and less bits to identify the shift amount. Such an approach provides a particularly efficient encoding of both the shift amount and the element size within the instruction.

In some examples, in response to the shift indication, the instruction decoder is configured to determine a shift magnitude between zero and the intermediate value bit size. Alternatively, it may be possible to restrict the extent of the shift magnitude in order to reduce the number of bits required to specify the shift indication, and hence save encoding space. For example, a saving of encoding space can be achieved when in response to this shift indication, the instruction decoder is configured to determine a shift magnitude between zero and half that of the intermediate value bit size, which will typically provide a shift large enough to align the output window with any subset of bits of the intermediate value of interest. However, the present technique recognises that in some corner cases, it may be preferable to maintain a shift magnitude between zero and the intermediate value bit size. For example, when performing accumulation, it may be desirable to maintain an accumulation format that differs from that of the input operands in order to avoid any potential overflow that might otherwise occur. By being able to shift beyond half the intermediate value bit size, this can enable account to be taken of the number of guard bits required to avoid overflow.

In some examples, the apparatus further comprises a programmable control register to store a fixed point format indication. As mentioned earlier, the arithmetic operation with shift instruction can be arranged to be a fixed point format agnostic instruction, in that the operations performed on the input operands do not themselves require knowledge of the particular fixed point format of the input operands. However, by using a programmable control register to store a fixed point format indication, this enables determination to be made as to the format of the operands. This could for example be useful in interpreting the fixed point format of the target portion of the intermediate value selected based on the shift indication.

In one example implementation the apparatus may further comprise a set of registers, and the arithmetic operation with shift instruction specifies a plurality of source registers from the set to provide input operands and a destination register from the set to store a result operand. The source registers are constrained to be chosen from a first subset of the set and the destination register is constrained to be chosen from a second subset of the set different to the first subset. By constraining the choice of source and destination registers in this way, it is possible to provide a more efficient encoding of the register information within the instruction.

Some particular examples of the present technique will now be described with reference to the figures.

FIG. 1 shows one example of an apparatus 100 according to the present technique. The apparatus 100 comprises an instruction decoder 102 arranged to fetch and decode instructions from memory. The instruction decoder 102 is further arranged to generate control signals 104 to control processing circuitry 106 on the basis of the decoded instructions. In response to some control signals the processing circuitry 106 is configured to retrieve source operands from registers 118, perform a data processing operation using the source operands to generate a result, and store the result to a destination register of the registers 118. For example, the processing circuitry 106 is provided with a multiply unit (MUL) 108 and a multiply and accumulate unit (MAC) 110 for performing multiply, and multiply and accumulate operations respectively. While the MUL 108 and MAC 110 are illustrated as distinct units in the example of FIG. 1, in practice a single hardware unit may be provided to perform both operations. It will also be appreciated that the processing circuitry 100 may be arranged to perform other arithmetic operations such as add, subtract and divide, for example. The control register 124 stores control parameters which may be referenced by the processing circuitry when performing the data processing operations.

The apparatus 100 can be arranged to perform fixed point arithmetic operations, which are commonly used in a number of applications. For example, in digital signal processing algorithms, the use of floating point instructions can result in slower processing. Therefore, fixed point operations may be favoured in this case.

Figure 2:
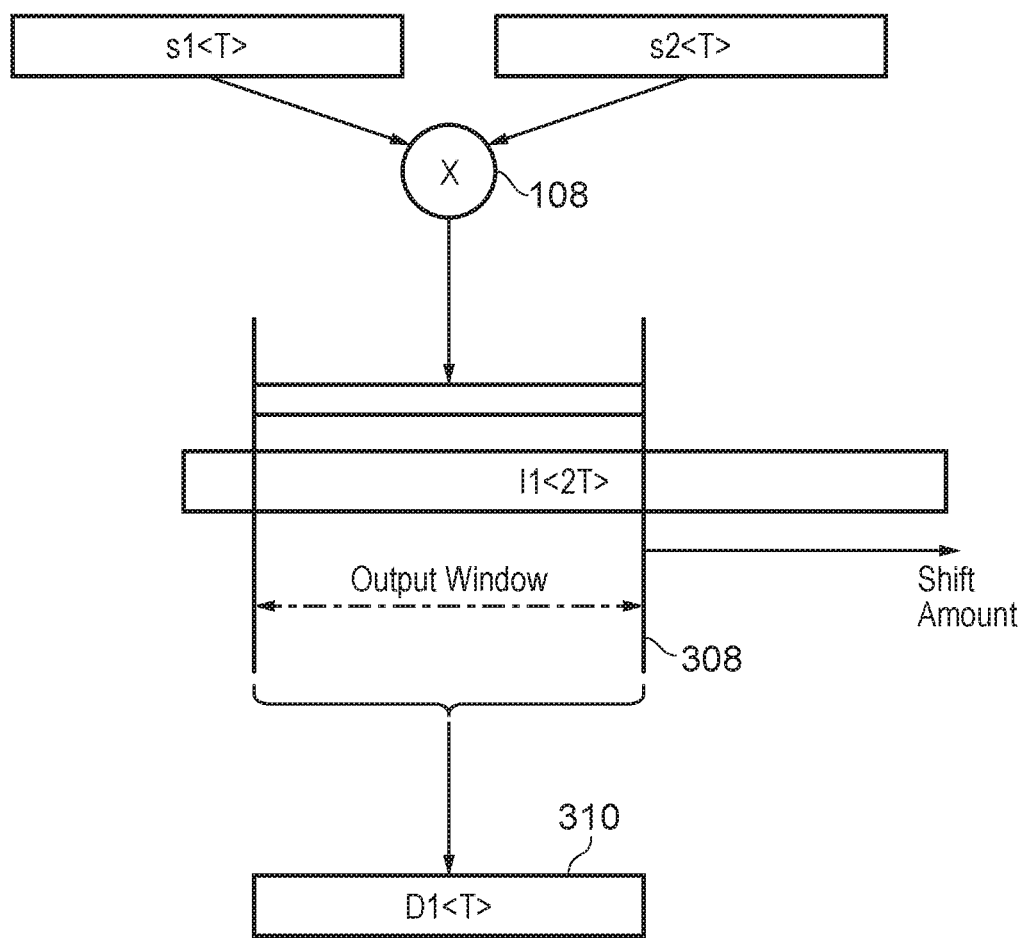
FIG. 2 illustrates an example of the data processing operations performed in response to a fixed point format agnostic instruction according to the present technique.

FIG. 2 illustrates conceptually how multiplication of two operands may be performed by the data processing apparatus 100. As can be seen from FIG. 2, two T-bit input operands, S1 and s2, are multiplied by MUL 108. As a result of the multiplication operation, an intermediate result, I1, is generated, which is 2T-bits wide. However, it may be undesireable to accommodate such a large result. For example, in some arrangements, subsequent stages of a pipeline, or the available destination registers, may only be T-bits wide, and hence unable to receive a 2T-bit value. As another example, it may merely be the case that the increased precision available from the 2T-bit value is not required for subsequent processing. In order to disregard any bits of I1 that are not to be included in the final result, the data processing apparatus 100 is configured to employ shifter 112 of FIG. 1. With respect to an output window 308 whose size is dependent on the number of bits required in the output, the output window can be slid left or right across the intermediate value so that the desired bits of the intermediate value fall within the output window, with those bits than being propagated as the output D1 310. In one implementation, this functionality is achieved by right shifting the intermediate value by an amount specified by a programmable shift indication, in order that the desired bits of the intermediate value fall within the output window, with those bits than being propagated as the output D1 310. As can be seen, in the example of FIG. 2, the output window is T-bits wide, and hence D1 is also T-bits wide, equivalent in size to S1 and S2. However, in other examples the width of the output window 308 may differ from that of the input operands.

Figure 3A:
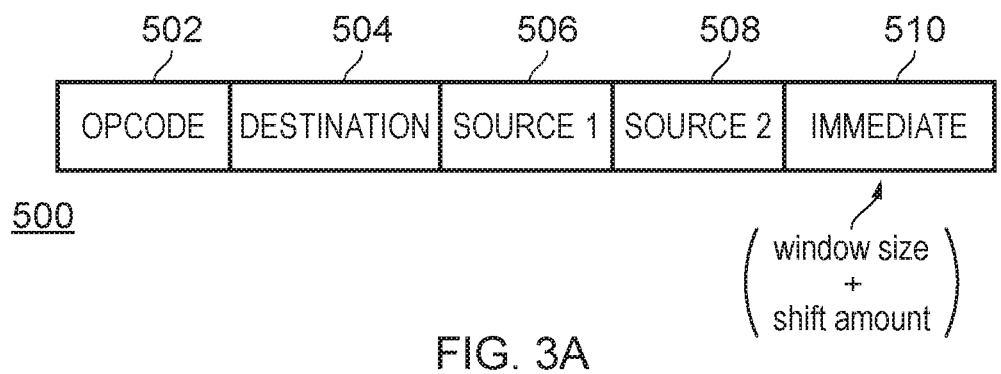
FIG. 3A shows one example of a fixed point format agnostic instruction according to the present technique.

FIG. 3A shows an example of a fixed point format agnostic instruction 500 according to the present technique, which is executable by the apparatus 100. As can be seen the instruction 500 includes an opcode field 502, which indicates the operation to be performed in response to the instruction, such as a multiplication operation for example. Various operations comprising at least a multiplication operation may be specified by the opcode, all of which are compatible with the present technique. The instruction also includes two source fields 506, 508, which specify source registers from the registers 118 storing source operands, and a destination field 504, specifying a destination register from the registers 118 in which to store the result of the operation. As described with reference to FIG. 2, the multiplication of the two source operands may generate a result up to twice the bit size of the source operands. In view of this property of operations comprising at least a multiplication operation, the fixed point format agnostic instruction 500 further includes an immediate field 510, which is programmable by a user. The immediate field 510 can be used to encode the shift amount to indicate where the output window should be aligned relative to the intermediate result. The bits of the intermediate result of the multiplication operation falling within the window can then be extracted as the final result. The use of an immediate field of the fixed point format agnostic instruction provides a programmer with the ability to freely control the precision of the output results of the operation comprising at least a multiplication operation by simply updating the immediate field. This relieves the programmer of the need to prepare bespoke sequences of instructions for each operation comprising at least a multiplication operation in the program code. As a result of the operation being performed by the apparatus in response to just one instruction, the operation can also be performed faster, and by consuming less power, than if multiple instructions were to be executed. Further, the same instruction can be used irrespective of the fixed point format being processed, as the shift amount can take into account any difference between the fixed point format of the result and the fixed point format of the input operands.

The immediate field 510 may also be used to encode the size of the output window. In some examples it will be desirable to have an output window matching the size of the input operands. However, in other examples, other sizes of the output window may be desired. In any case, the immediate field in the fixed point format agnostic instruction can be used to provide the programmer with the same level of control over the output window dimensions as that provided with respect to the shift amount. Alternatively, the output window may be fixed at a predetermined size, and the apparatus 100 can simply operate on this assumption. This frees up space in the fixed point format agnostic instruction 100. In some other examples, the output window size may be specified in a control register 124 of the apparatus for example.

Figure 3B:
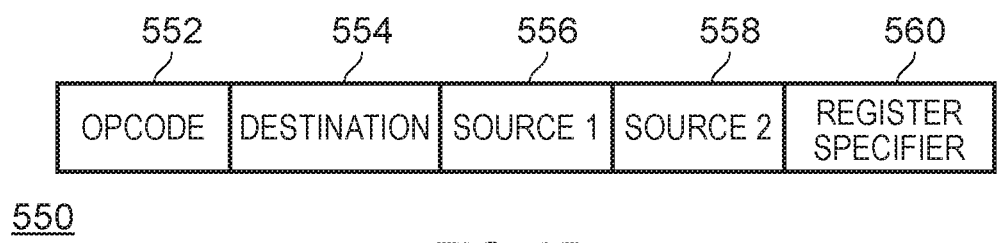
FIG. 3B shows another example of a fixed point format agnostic instruction according to the present technique.

Another example of the fixed point format agnostic instruction 550 is shown in FIG. 3B. As can be seen, the instruction 550 is the same as that of FIG. 3A, except that instead of an immediate field 510, a register specifier 560 is included. This register specifier may indicate one of the registers 118, for example, and the desired shift amount can be written into the register, for example by execution of a preceding instruction.

Figure 4A:
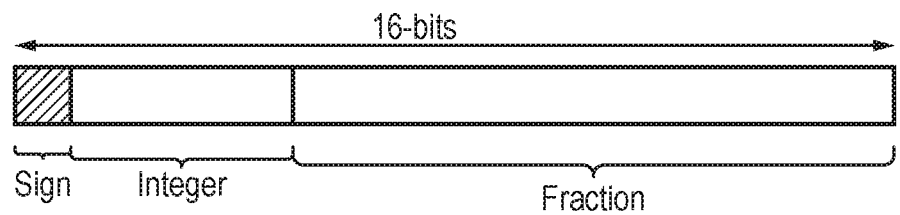
FIGS. 4A, 4B and 4C show different Q-formats for representation of fixed point numbers.
Figure 4B:
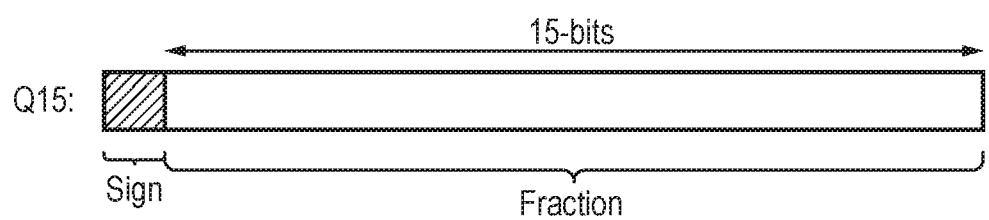

FIG. 4 shows some a number format that may be used for the representation of fixed point values, known as Q-format. As can be seen from FIG. 4A, the Q format comprises a sign bit, indicating whether the fixed point number is positive or negative, integer bits corresponding to the integer part of a number and fraction bits corresponding to the decimal part of the number.

Figure 4C:
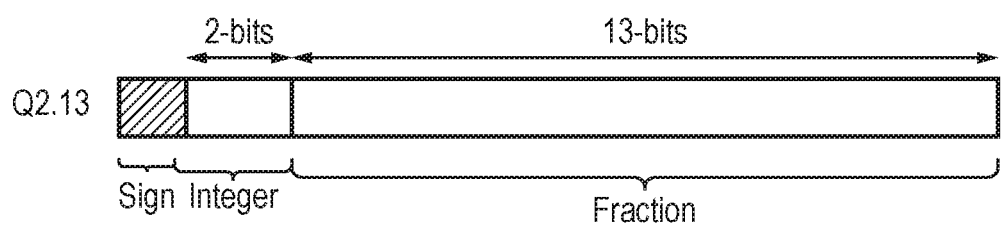

The integer bits are not necessary in the Q format when the number to be represented does not have an integer part. For example, as can be seen from FIG. 4B, a 16-bit Q format can consist only of one sign bit and 15 fraction bits. Such a format is known as Q15, indicative that 15 fraction bits are available, with the sign bit being implicit. When the number to be represented does include an integer part, a different Q-format can be used to reflect this. One example of such a format is illustrated in FIG. 4C, which shows an example of the Q2.13 format. As can be derived from the term Q2.13, this format includes 2 integer bits, and 13 fraction bits, as well as the implicit sign bit.

Figure 5:
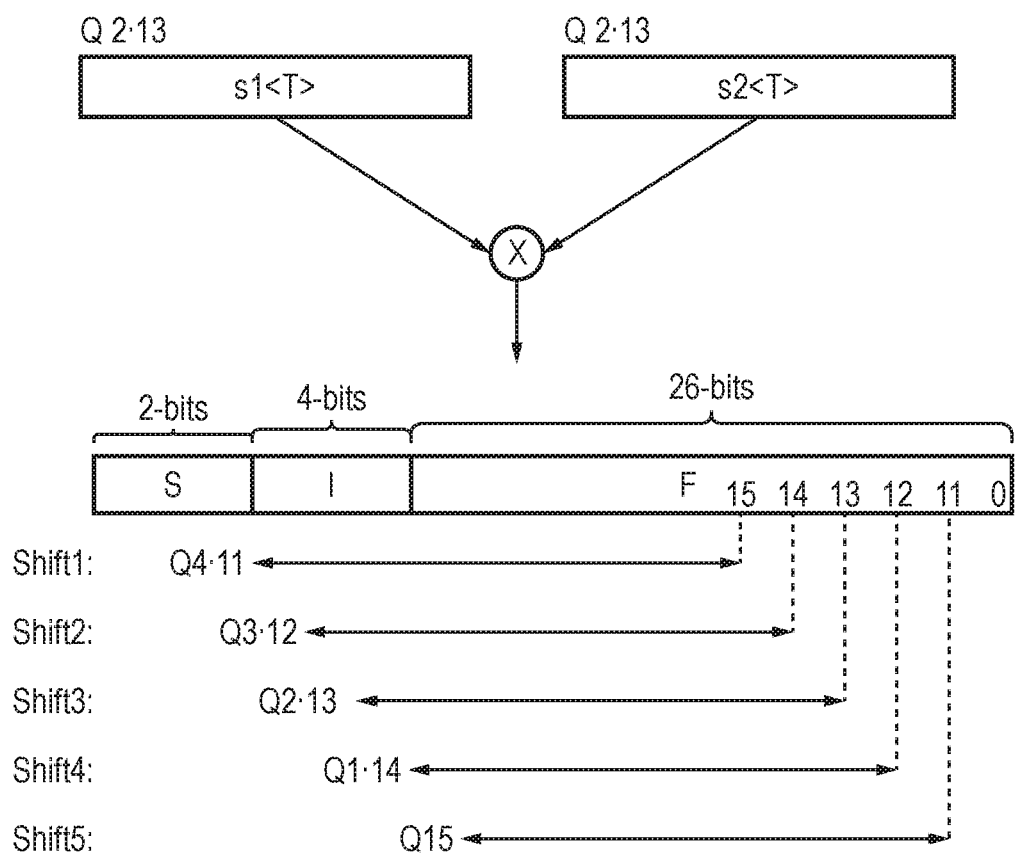
FIG. 5 illustrates how selecting different shift amounts specified by fixed point format agnostic instructions may be used to generate results having different Q-formats.

Due to the nature of the Q format, different shift amounts of the output window will generate results having different Q formats. This is illustrated in FIG. 5, which shows two signed input numbers in Q2.13 format, which when multiplied generate a 32-bit intermediate value, as described with reference to FIG. 2. Two bits of the intermediate value will correspond to the sign bits, four bits of the intermediate value will correspond to the integer bits, and the remaining 26 bits will correspond to the fraction bits. The number could be in 2's complement form in which case the sign bit is implied.

Therefore, if a 16-bit sized output window is defined, and the intermediate value is shifted right by a shift amount of 15 bits, as shown in 'Shift 1' of FIG. 5, the output window will capture from the intermediate value all 4 of the integer bits, and 11 of the fraction bits, which is effectively the result of the multiplication operation in Q4.11 format. On the other hand, if the intermediate value were instead only right shifted by 14 bits, as shown in 'Shift 2' of FIG. 5, then the bits captured from the intermediate value will be representative of the result of the multiplication in Q3.12. Similarly, from 'Shift 3' to 'Shift 5' of FIG. 5, it can be seen that as the right shift amount is decreased with respect to the least significant bit of the intermediate value, the number of integer bits decreases and the number of fraction bits increases in the Q format of the final result, corresponding to a result with reduced range, but greater precision. The present technique recognises that this property of Q formats, which is applicable to both signed and unsigned numbers, can be exploited in order to efficiently trim intermediate results into final output results having a reduced size, and one of a variety of Q formats, by way of the output window and shift amount.

The output window illustrated in FIG. 5 is used to select the integer and fraction portions of the output, which in the illustrated example account for 15 of the 16 bits. The sign bit of the output is then given by the sign information in the intermediate value.

Figure 6:
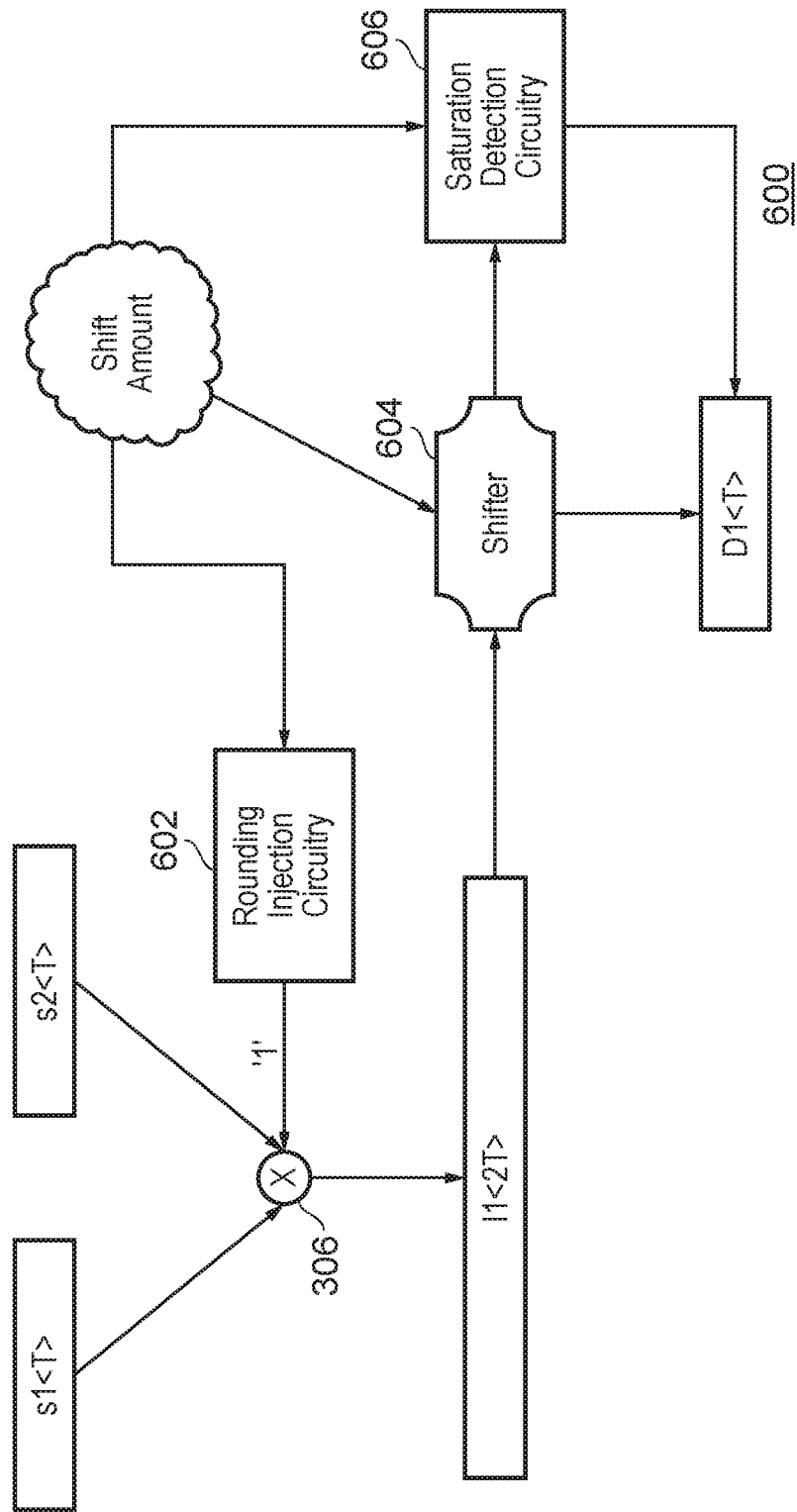
FIG. 6 shows an example of a multiply unit including rounding injection circuitry and saturation detection circuitry.

FIG. 6 shows an example of a multiply unit (MUL) 600 arranged to perform a multiplication operation in response to a fixed point format agnostic instruction that specifies a multiply operation (FXMUL). The FXMUL instruction may take the following format:

S(Q?) (R?)FXMUL Zd0.<T>, Zs0.<T>, Zs1.<T>, #imm

The opcode of the FXMUL instruction, "S(Q?) (R?) FXMUL", indicates that the operation to be performed is a fixed point multiplication operation, and indicates whether any rounding and saturation operations are to be performed (Q indicating saturation and R indicating rounding). Source and destination registers for the multiplication operation are specified by "Zd0.<T>, Zs0.<T>, Zs1.<T>", and the immediate field "#imm" is provided to indicate the shift amount. T indicates the element size being operated on.

The MUL 600 is responsive to the FXMUL instruction in a manner similar to the example of FIG. 2. Two T-bit input operands, S1 and S2 are first multiplied together by multiplier 306 to generate a 2T-bit sized intermediate value, I1. The shifter 604 then performs a right shift based on the shift indication encoded as the immediate value in the instruction, in order to align the desired bits of the intermediate value I1 with the output window, and the bits of I1 falling within the output window are output as the result, D1, of the multiplication.

The MUL 600 also includes adjustment circuitry comprising rounding injection circuitry 602, and saturation detection circuitry 606, and is arranged to account for the bits of I1 which fall outside of the output window in the result D1. For example, the rounding injection circuitry 602 injects a rounding constant into the multiplier 306 (which may be arranged to add together a series of partial products), the rounding constant being injected at a bit position to the right of the least significant bit of the target portion of the intermediate value such that in combination with the less significant bits falling outside of the output window, the addition of the rounding constant is such that the target portion is rounded correctly having regard to those less significant bits. The saturation detection circuitry 606 determines whether any '1's are present in the more significant bits of the intermediate value that fall outside of the output window. If a '1' is detected by the saturation detection circuitry 606, then the largest possible value representable by the final result is desired, and the saturation detection circuitry 606 repopulates all bits of D1, other than the sign bit, with '1's.

Figure 7A:
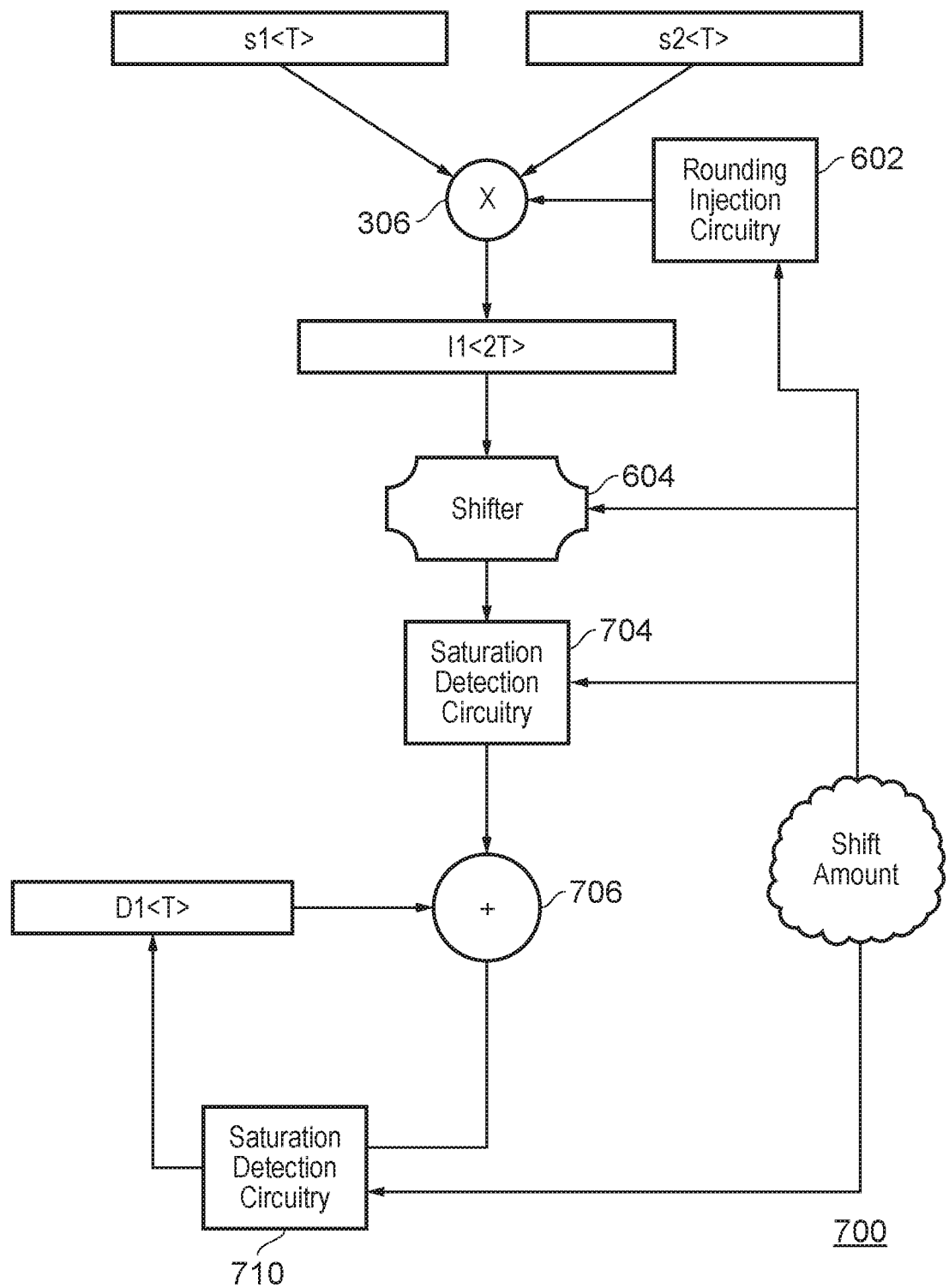
FIG. 7A shows an example of a multiply and accumulate unit including rounding injection circuitry and saturation detection circuitry.

FIG. 7A shows an example of a multiply and accumulate unit (MAC) 700 arranged to perform a multiply operation and accumulate operation in response to a fixed point agnostic instruction that specifies a multiply and accumulate operation (FXMLA). The FXMLA may take the following format:

S(Q?) (R?)FXMLA Zds0.<T>, Zs1.<T>, Zs2.<T>, #imm

The FXMLA instruction is similar to the FXMUL instruction, except that the opcode "FXMLA" instead specifies that the operation to be performed is a fixed point multiply and accumulate operation.

The MAC 700 is responsive to the FXMLA instruction, and includes a multiplier 306, rounding injection circuitry 602, and shifter 604 in the same configuration as the MUL 600 of FIG. 6. However, in addition, the MAC 700 includes an adder 706, arranged to update the value an accumulator D1 by adding the result of the multiplication to it. Saturation detection circuitry 710 is also provided to detect whether the result of this addition is larger than any value that can be expressed in T-bits, as this is the largest size acceptable for D1. If this is the case, the saturation detection circuitry sets all of the integer bits and fraction bits of the value in D1 to '1', rather than storing the result of addition, so that the largest possible value can be expressed as the result of the multiply and accumulate result.

Saturation detection circuitry 704 may also be provided between the shifter 604 and the adder 706, to determine whether the portion of target bits selected during the shift omits any more significant bits having a value of '1'. If this is the case, then the target portion of the intermediate result should have the largest positive or negative magnitude as possible, depending on the sign of the intermediate value. Hence the saturation detection circuitry 704 will set the value of the target portion to the highest positive or lowest negative value depending on whether an overflow or an underflow occurred, and pass this saturated value to the adder 706.

However, it will be appreciated that saturation circuitry 710, and saturation circuitry 704 are optional, and that any combination of the two saturation operations described with reference to FIG. 7A can be provided:

// No SAT and No RND
ds0=ds0+((s1×s2)>>shift)
// SAT applied only to SHIFT stage
ds0=ds0+SAT(RND((s1×s2)>>shift))
// SAT applied only at Accumulation Stage
ds0=SAT(ds0+RND((s1×s2)>>shift))
// SAT applied at both SHIFT and Accumulation Stage
ds0=SAT(ds0+SAT(RND((s1×s2)>>shift)))
Rounding can also be disabled if desired.

Figure 7B:
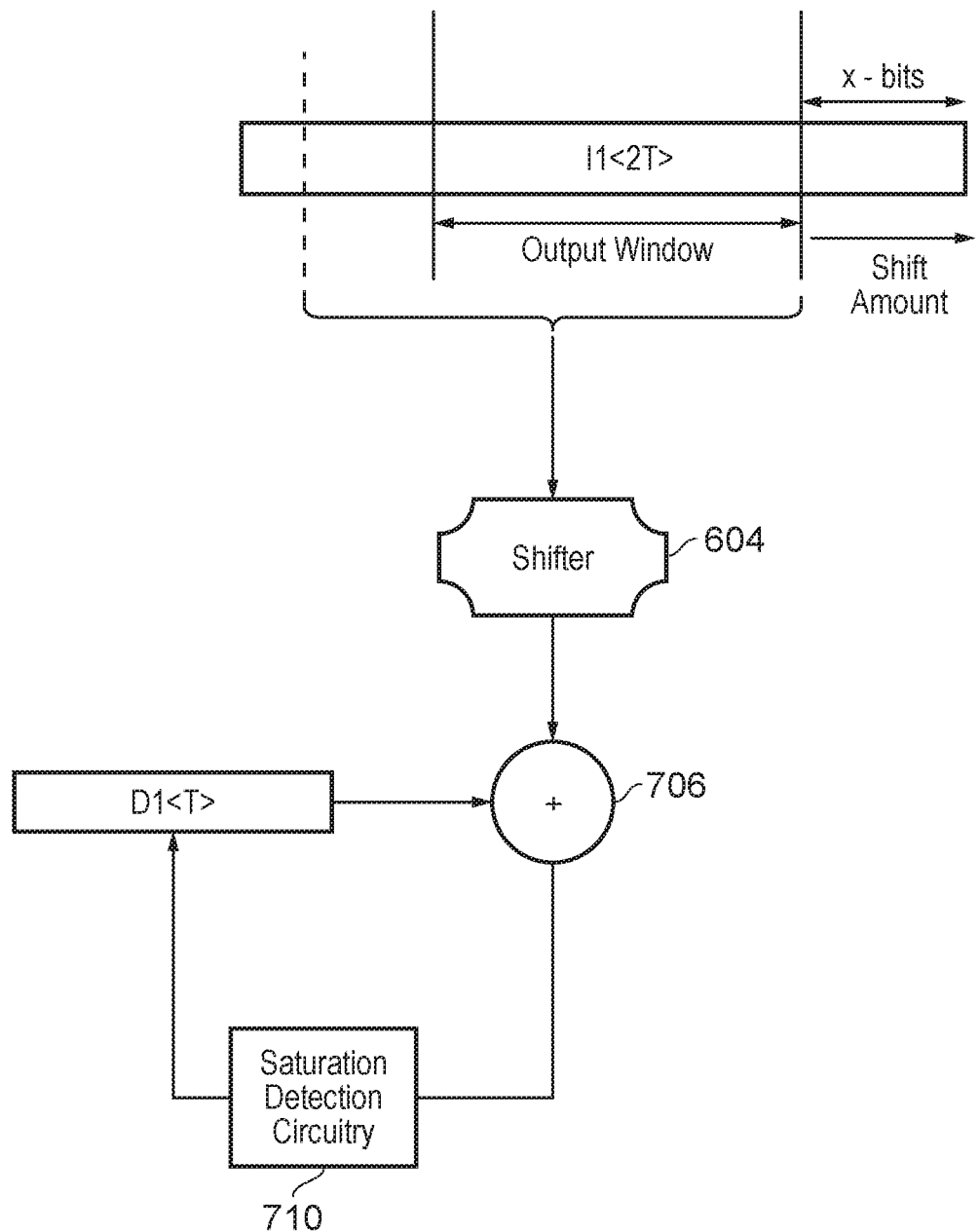
FIG. 7B shows another implementation of the multiply and accumulate unit of FIG. 7.

To improve accuracy in the example where saturation detection is performed only at the accumulation stage, and not at the shift stage, the accumulation may be performed on the basis of an extended intermediate value. For example, as shown in FIG. 7B, rather than shifting I1 to trim it down to T-bits, the shifter 604 may instead select the T-bits falling within the output window, as well as some additional more significant bits for the accumulation. In this way, more significant bits that would otherwise fall outside the output window, but would be accounted for by saturation circuitry 704, can instead be accounted for by including them in the accumulation operation. Any saturation can then be detected and accounted for exclusively by saturation detection circuitry 710.

Figure 8:
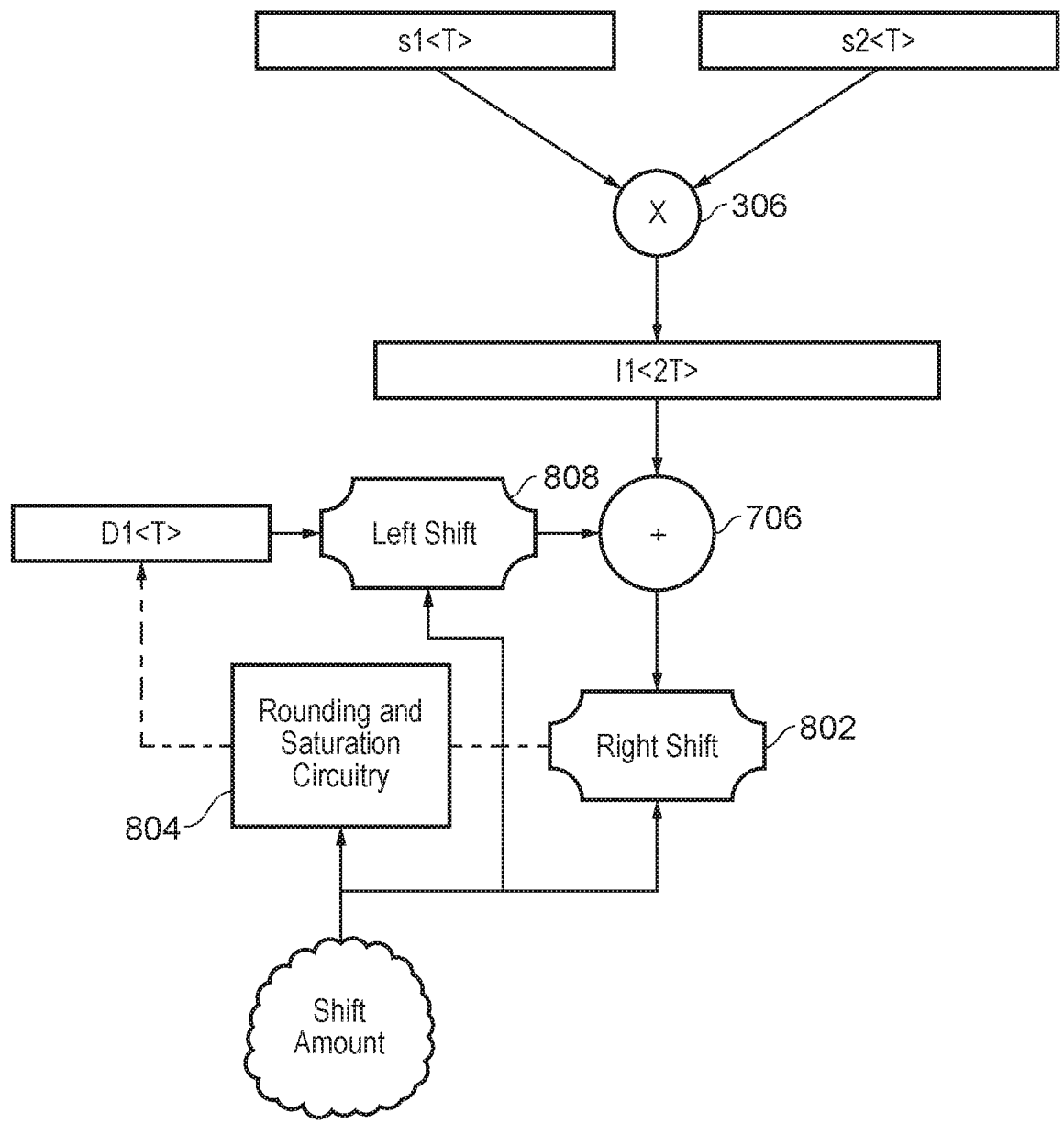
FIG. 8 shows another example of a multiply and accumulate unit.

FIG. 8 shows yet another example of a MAC 800 according to the present technique. In MAC 800 the accumulate operation is performed on the basis of all bits of the intermediate value I1, rather than a trimmed value as is the case in FIGS. 7A/7B. To correctly perform the accumulation operation, the accumulator is first left shifted by left shifter 808, to extend the T-bit value with the necessary number of less significant bits such that the accumulator aligns with the desired target portion of I1. After the accumulation operation, the result is then right shifted by right shifter 802 to align the desired bits of the result with the output window, hence trimming the result down to T-bits. This implementation has the benefit that no bits of I1 are disregarded prior to the accumulate operation, and hence there is no need to provide rounding or saturation circuitry to at this stage, or any earlier stages. Instead, a single instance of rounding and saturation 804 is provided to perform any necessary adjustment operations. However, the accumulator 706 needs to be wide enough to operate at the full 2T width. The operation of the MAC 800 can be expressed as:

ds0=SAT(RND((realign(ds0)+(s1×s2))>>shift))  realign (ds0)=ds0<<shift

Figure 9:
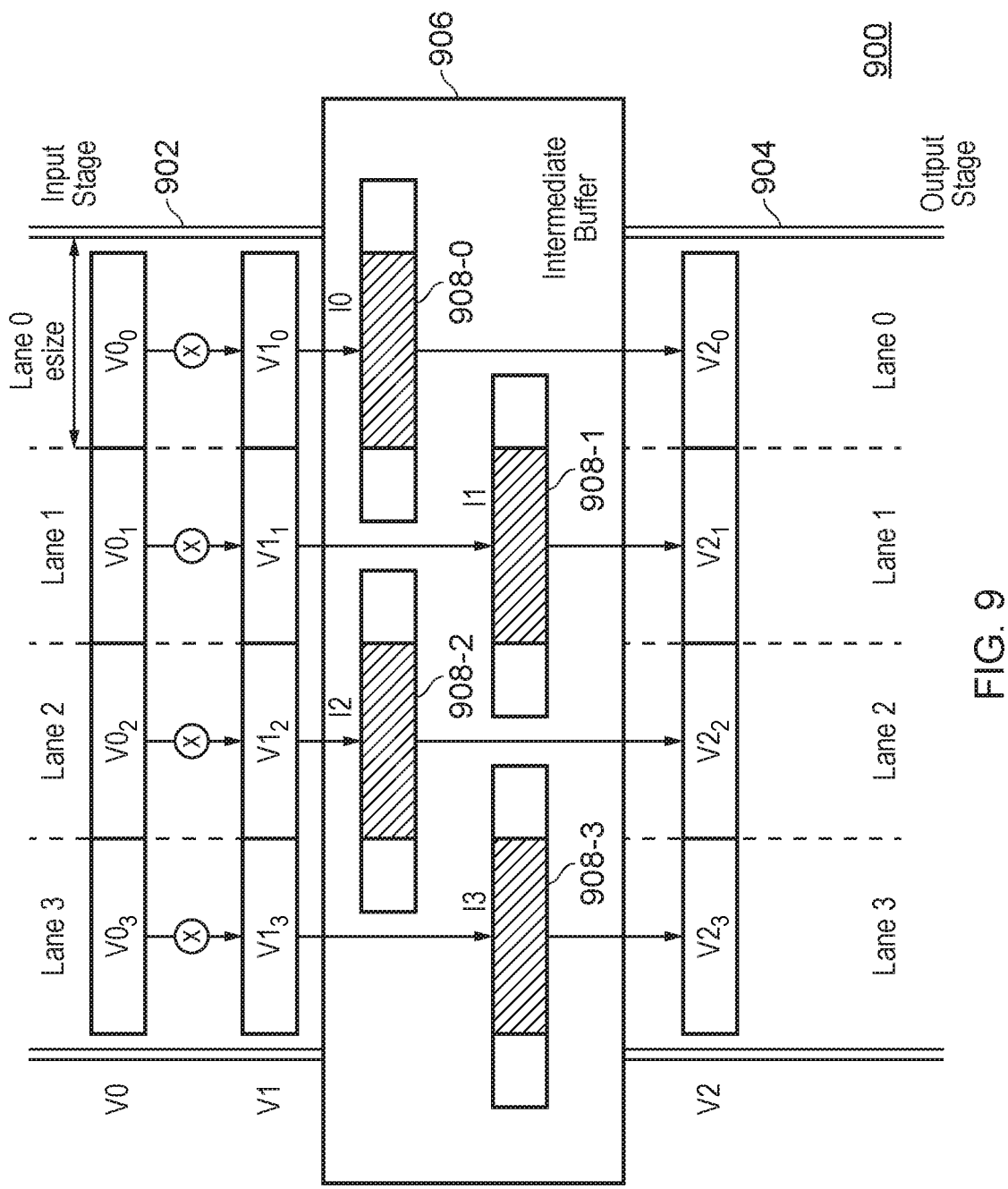
FIG. 9 illustrates how the present technique may be applied to vector processing.

In some examples, the data processing apparatus 100 is configured to perform vector processing, and the fixed point format agnostic instruction can also be used to process vector operands. An example of vector processing circuitry 900 that may be included in the data processing apparatus 100 is shown in FIG. 9. As can be seen from FIG. 9, vector operand V0 and vector operand V1 are received via an input stage 902, and are subjected to a multiplication operation. The input stage in this example comprises four lanes, each of which can accommodate a data element of the vectors, each data element having an element size (esize). However, as discussed with reference to FIG. 2, and as shown by the intermediate values I0-I3, multiplication of two elements of each vector will generate an intermediate value up to twice the size of the input elements. These intermediate values are too large for the input stage 902 and the subsequent output stage 904, and an intermediate buffer 906 is provided to temporarily store the intermediate values. Whilst stored in the intermediate buffer, the data processing apparatus 100 is configured to trim each intermediate value based on the esize value and the shift amount so that suitably sized data elements can be output via the output stage 904. This trimming is performed in the same manner as described with reference to the examples in FIG. 2. Specifically, each of the intermediate values are aligned with an output window 908 in order to select the bits of the intermediate values to be output. The size of the output windows 908 is set to match the esize such that the output results will fit within the lanes of the output stage 904. The shift of each of the output windows can be determined based on the desired precision of the results to be included within the result vector V2.

Employing the present technique in this vector arrangement is particularly efficient, as this allows more densely packed vector operands to be processed at any one time, and hence improves throughput. For example, if the arithmetic operation comprising at least a multiplication operation were instead performed in response to a sequence of instructions, any intermediate values generated during execution of the sequence would need to be stored back to registers, before a subsequent instruction can be executed to retrieve the intermediate values and trim them. As the aggregate size of the intermediate values will be double that of the input operands, the size of the intermediate values will constrain the number of operations that can be performed in parallel, i.e. the number of lanes of parallel processing. However, by using the instructions of the present described technique, as illustrated in FIG. 9, it is possible to double the throughput.

Figure 10:
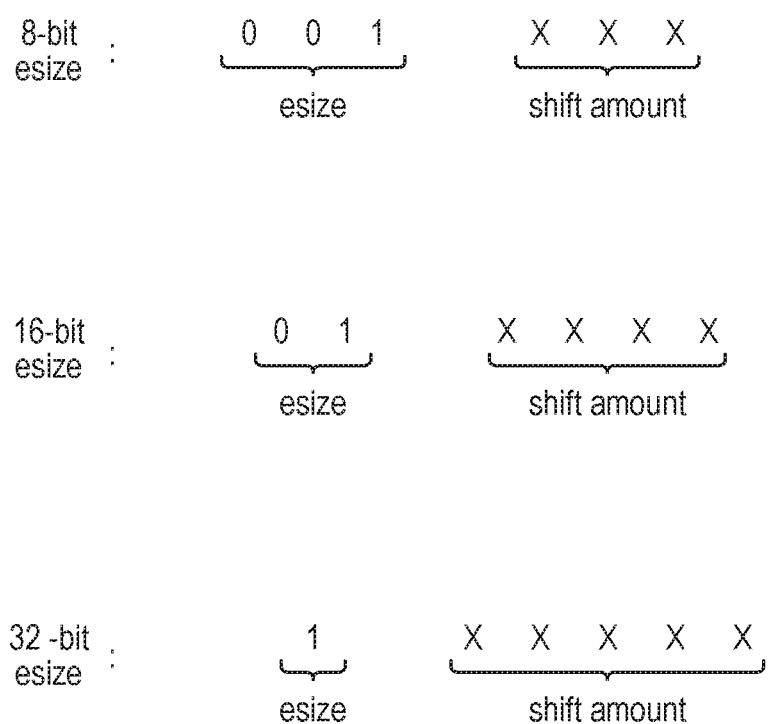
FIG. 10 shows an example of an encoding technique for encoding an element size within the shift indication.

FIG. 10 illustrates an example of an encoding technique that can be used to minimise the number of bits in the shift indication. In this example, 6 bits for specifying the shift indication are available. The encoding technique according to the FIG. 10 technique encodes both the element size of the data elements of the vector operands, and the shift amount in these 6 bits. The encoding is performed on the assumption that the vector processing circuitry will exclusively operate on operands having one of three element sizes, either 8-bits, 16-bits or 32 bits. The present technique recognises that limiting operations to element sizes of a particular number of predetermined sizes allows the shift indication to be efficiently encoded in a relatively small number of bits. For example, as can be seen from FIG. 6, six bits can be used to encode any shift indication for one of three different element sizes.

When the element size is 8-bits, the present technique recognises that only three bits are required for encoding the shift amount such that the output window can be shifted to any of the possible locations relative to the intermediate value. That is, eight different values can be expressed with 3-bits, and when the element size is 8-bits, any intermediate value will be up to 16-bits wide, and hence the output window can only be aligned in 8 different locations relative to the intermediate value. Therefore, three bits is sufficient to specify any one of the possible locations that an 8-bit output window can be aligned relative to the intermediate result. As only three bits are required for encoding the shift amount, the remaining three bits are encoded to indicate that the element size is 8-bits a value of '001'.

When the element size is 16-bits, an extra bit is needed for encoding the shift amount, so that any of the 16 different locations at which the output window can be aligned with the intermediate value can be specified. The remaining two bits are encoded to indicate that the element size is 16-bits with a value of '01'. Similarly, when the element size is 32-bits, five bits of the shift indication are used to encode the shift amount, whilst the remaining bit is used to indicate that the element size is 32-bits with a value of '1'.

A reduction in encoding space can be achieved by limiting the shift amount to half that of the element size, as this shift amount will typically allow the output window to be shifted to any subset of bits of the intermediate value of interest, hence allowing one of the possible Q formats for the output to be selected. On the other hand, a shift amount up to that of the element size may be preferable in some other cases to accommodate certain corner cases. For example, when the input values for a series of MAC operations are in a Q15 format, having 1 sign bit, no integer bits, and 15 fraction bits, the repeated MAC operations may cause an intermediate value in Q15 format to saturate and overflow. To avoid this, and capture the full range of the accumulator, the accumulator may instead be kept in Q1.14 format, for example. In this case, a shift equal to or greater than half the element size may be required depending on how many guard bits are required to avoid overflow. As another example, one may only be interested in the sign of the output value, and not the integer or fraction bits. In such an example, a larger shift amount may also be preferable.

Further savings in the instruction encoding space can be achieved by limiting the locations of the input registers and the output registers. For example, if the input registers are selected from the lower register group (for example registers Z0 to Z15), and the output register is selected from a higher register group (for example registers Z16 to Z31), then the input register encoding is 0XXXX and the output register encoding is 1XXXX. However, the leading "0" and "1" does not need to be encoded within the instruction as it is implied, hence reducing the register specifiers from 5 bits to 4 bits.

Figure 11:
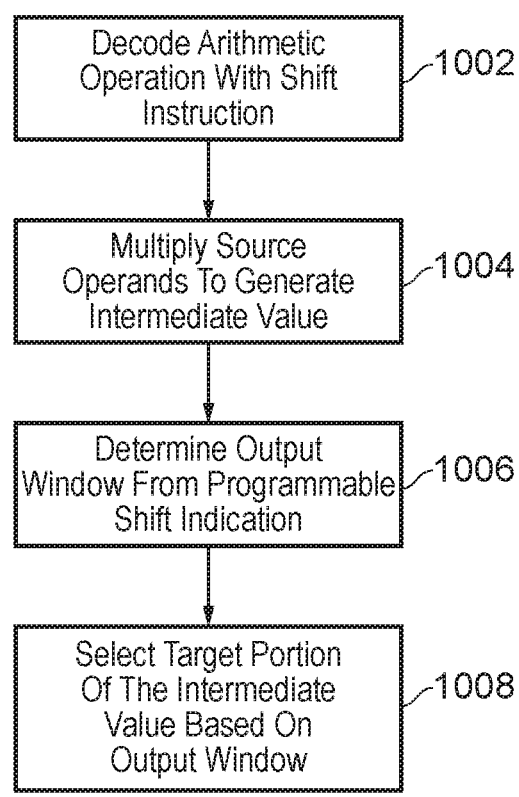
FIG. 11 illustrates a method according to the present technique.

FIG. 11 shows a method according to the present technique. First a fixed point format agnostic instruction, also referred to as an arithmetic operation with shift instruction, is decoded in step 1002. In response to the decoded instruction, source operands are multiplied to generate an intermediate value, as shown in step 1004, the intermediate value being up to twice as large as the source operands. In step 1006 a position of an output window is also determined based on the programmable shift indication specified by the arithmetic operation with shift instruction. The output window is then used to select a target portion of the intermediate value as shown in step 1008. As mentioned earlier, in practice this can be achieved by right shifting the intermediate value by a specified amount, so that the desired bits of the intermediate value align with the output window.

Figure 12:
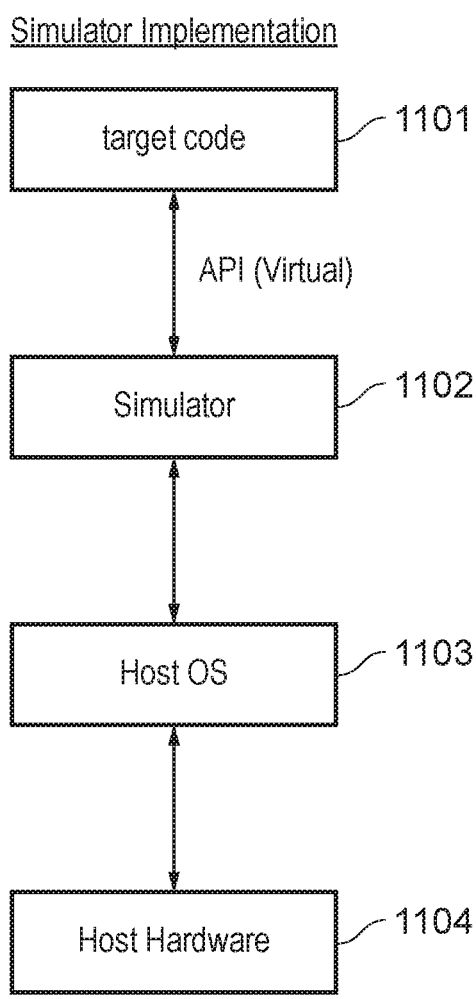
FIG. 12 shows a simulator implementation to implement the present technique.

FIG. 12 illustrates a simulator implementation that may be used. Whilst the earlier described examples implement the present technique in terms of apparatus and methods for operating specific processing hardware supporting the techniques concerned, it is also possible to provide an instruction execution environment in accordance with the examples described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation may run on a host processor 1104, optionally running a host operating system 1103, supporting the simulator program 1102. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, Pages 53-63.

To the extent that examples have previously been described with reference to particular hardware constructs or features, in a simulated embodiment, equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. In arrangements where one or more of the hardware elements referenced in the previously described embodiments are present on the host hardware (for example, host processor 1104), some simulated embodiments may make use of the host hardware, where suitable.

The simulator program 1102 may be stored on a computer-readable storage medium (which may be a non-transitory medium), and provides a program interface (instruction execution environment) to the target code 1101 (which may include applications, operating systems and a hypervisor) which is the same as the application program interface of the hardware architecture being modelled by the simulator program 1102. Thus, the program instructions of the target code 1101, including the fixed point format agnostic instruction described above, may be executed from within the instruction execution environment using the simulator program 1102, so that a host computer 1103 which does not actually have the hardware features of the apparatus 100 discussed above can emulate these features.

It will be appreciated that the data processing operations described with reference to FIGS. 6, 7 and 8, may be replicated across multiple lanes to implement vector processing operations, where for two vector source operands, the arithmetic operation is performed for two corresponding data elements of each vector source operand, to a generate a data element of the destination operand.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus comprising:
   processing circuitry to perform data processing operations; and
   instruction decode circuitry responsive to program instructions to generate control signals to control the processing circuitry to perform the data processing operations;
   wherein in response to an arithmetic operation with shift instruction specifying performance of an arithmetic operation comprising at least a multiplication operation, and having a field which provides a programmable shift indication, the instruction decode circuitry is configured to control the processing circuitry to perform the arithmetic operation during which an intermediate value is produced, and to select a target portion of the intermediate value based on an output window determined from the programmable shift indication; and
   wherein the processing circuitry is configured to support processing of operands having different fixed point formats, and the arithmetic operation with shift instruction is a fixed point format agnostic instruction.

2. The apparatus according to claim 1, wherein the programmable shift indication is determined in dependence on a fixed point format of each input operand to the arithmetic operation, and a target fixed point format of an output of the arithmetic operation.

3. The apparatus according to claim 1, wherein the field is an immediate field of the arithmetic operation with shift instruction encoding the programmable shift indication.

4. The apparatus according to claim 1, wherein the field is a register specifier to specify a register storing the programmable shift indication.

5. The apparatus according to claim 1, further comprising adjustment circuitry to control an adjustment operation on the target portion of the intermediate value based on the output window.

6. The apparatus according to claim 5, wherein the adjustment operation is at least one of a rounding operation and a saturation operation, wherein the value of bits of the intermediate value less significant than the target portion are used when the adjustment operation is the rounding operation, and the value of bits of the intermediate value more significant than the target portion are used when the adjustment operation is the saturation operation.

7. The apparatus according to claim 6, wherein the arithmetic operation is a multiply and accumulate operation, and the adjustment circuitry comprises saturation detection circuitry configured to determine whether saturation occurs as a result of the accumulate operation, wherein
   when saturation does occur as a result of the accumulate operation, the saturation detection circuitry is configured to provide an output saturated value as a result of the multiply and accumulate operation.

8. The apparatus according to claim 7, wherein the saturation detection circuitry is further configured to determine whether saturation occurs as a result of the multiply operation based on the output window, wherein
   when saturation does occur as a result of the multiply operation, the saturation detection circuitry is configured to provide an intermediate saturated value as the target portion input to the accumulate operation.

9. The apparatus according to claim 6, wherein the arithmetic operation is a multiply and accumulate operation involving a multiplication operation and a subsequent accumulate operation, and the apparatus further comprises:
   alignment circuitry to align an accumulator value with a full precision product result of the multiplication operation prior to performance of the accumulate operation, wherein
   the intermediate value is formed by the result of the accumulate operation,
   the processing circuitry is configured to select the target portion from the intermediate value resulting from the accumulate operation, and
   the adjustment circuitry is rounding and saturation circuitry to perform rounding and saturation operations on the target portion.

10. The apparatus according to claim 1, wherein operands of the arithmetic operation comprise M-bits, and the intermediate value comprises N bits, wherein N is greater than M.

11. The apparatus according to claim 10, further comprising an intermediate buffer to store the intermediate value of the arithmetic operation.

12. The apparatus according to claim 1, wherein said processing circuitry is configured to perform vector processing wherein the data processing operations are performed on each data element of vector operands to generate corresponding data elements of a result vector, wherein:
   in response to the arithmetic operation with shift instruction the instruction decode circuitry is configured to control the processing circuitry to perform the arithmetic operation for each data element of a first vector operand with each data element of a second vector operand to generate data elements of the result vector, and
   intermediate results of each arithmetic operation are stored in an intermediate buffer of the apparatus.

13. The apparatus according to claim 9, wherein a size of the output window selected by the processing circuitry is dependent on an element size of at least one of the first and second vector operands.

14. The apparatus as claimed in claim 12, wherein the processing circuitry provides a plurality of lanes of parallel processing such that the arithmetic operation is performed in parallel in each lane using corresponding data elements of the first and second vector operands.

15. The apparatus according to claim 12, wherein the shift indication encodes information indicative of the element size of the data elements of the vector operands.

16. The apparatus according to claim 1, wherein in response to the shift indication, the instruction decoder is configured to determine a shift magnitude between zero the intermediate value bit size.

17. The apparatus according to claim 2, further comprising a programmable control register to store a fixed point format.

18. The apparatus as claimed in claim 1, further comprising:
a set of registers;
wherein the arithmetic operation with shift instruction specifies a plurality of source registers from the set to provide input operands and a destination register from the set to store a result operand, and the source registers are constrained to be chosen from a first subset of the set and the destination register is constrained to be chosen from a second subset of the set different to the first subset.

19. A data processing method comprising:
executing software on processing circuitry to perform data processing operations; and
decoding instructions provided by the software to control the processing circuitry to perform the data processing operations;
wherein in response to an arithmetic operation with shift instruction specifying performance of an arithmetic operation comprising at least a multiplication operation, and having a field which provides a programmable shift indication, the method further comprises controlling the processing circuitry:
to perform the arithmetic operation during which an intermediate value is produced, and
to select a target portion of the intermediate value based on an output window determined from the programmable shift indication;
wherein the processing circuitry supports processing of operands having different fixed point formats, and the arithmetic operation with shift instruction is a fixed point format agnostic instruction.

20. A non-transitory computer-readable storage medium comprising a computer program for controlling a host data processing apparatus to provide an instruction execution environment comprising:
processing program logic to perform data processing operations; and
instruction decode logic responsive to program instructions to control the processing program logic to perform data processing operations;
wherein in response to an arithmetic operation with shift instruction specifying performance of an arithmetic operation comprising at least a multiplication operation, and having a field which provides a programmable shift indication, the instruction decode logic is configured to control the processing program logic to perform the arithmetic operation during which an intermediate value is produced, and to select a target portion of the intermediate value based on an output window determined from the programmable shift indication; and
wherein the processing program logic is configured to support processing of operands having different fixed point formats, and the arithmetic operation with shift instruction is a fixed point format agnostic instruction.

* * * * *